United States Patent Office
3,509,238
Patented Apr. 28, 1970

3,509,238
ABS GRAFT POLYBLENDS CONTAINING TWO GRAFT POLYMERS WITH DIFFERENT DEGREES OF GRAFTING
Norman E. Aubrey, South Hadley, and Michael B. Jastrzebski, Ware, Mass., assignors to Monsanto Company, St. Louis, Mo., a corporation of Delaware
Continuation-in-part of application Ser. No. 535,752, Mar. 21, 1966. This application Apr. 29, 1969, Ser. No. 824,356
Int. Cl. C08f 41/08, 41/04
U.S. Cl. 260—876
20 Claims

ABSTRACT OF THE DISCLOSURE

A polyblend contains a matrix interpolymer of monovinylidene aromatic hydrocarbon and an ethylenically unsaturated nitrile and two different graft copolymers having superstrates of an interpolymer of a monovinylidene aromatic hydrocarbon and an ethylenically unsaturated nitrile. One graft copolymer is relatively lightly grafted and the other is relatively highly grafted so as to provide a bimodal composition.

REFERENCE TO RELATED APPLICATION

The present application is a continuation-in-part of our copending application Ser. No. 535,752 filed Mar. 21, 1966, now abandoned, bearing the same title and by the same inventors.

BACKGROUND OF THE INVENTION

As is well known, polyblends of rubbers with styrene-acrylonitrile type interpolymers have advantages in providing compositions of desirable properties including toughness and chemical resistance as well as providing good formability. Generally, increasing the rubber content is advantageous in increasing the toughness, but some reduction in other properties such as gloss is generally experienced.

It is an object of the present invention to provide a novel polyblend of rubber with an interpolymer consisting at least principally of a monovinylidene aromatic hydrocarbon and an ethylenically unsaturated nitrile which exhibits a highly desirable balance of properties.

It is also an object to provide such a polyblend which is relatively easily and economically formulated and which affords the opportunity for facile tailoring of properties from standard, readily stocked components.

Another object is to provide such a polyblend which has high impact resistance, good gloss and good tensile properties and which affords a high degree of versatility.

Another object is to provide such a polyblend which has high impact resistance, good gloss and good tensile properties and which affords a high degree of versatility.

Another object is to provide a facile and relatively economical process for preparing such rubber-interpolymer polyblends which permits utilization of existing equipment and techniques for preparation of the grafted rubber components thereof.

Figure 1:
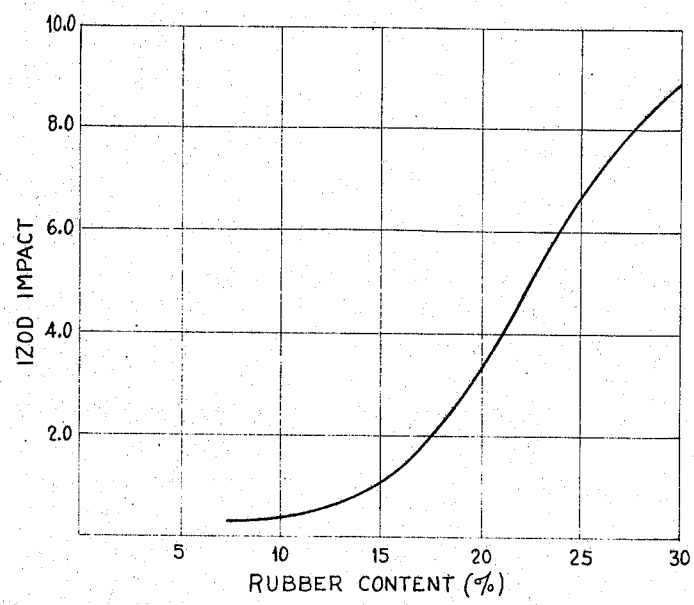
Figure 2:
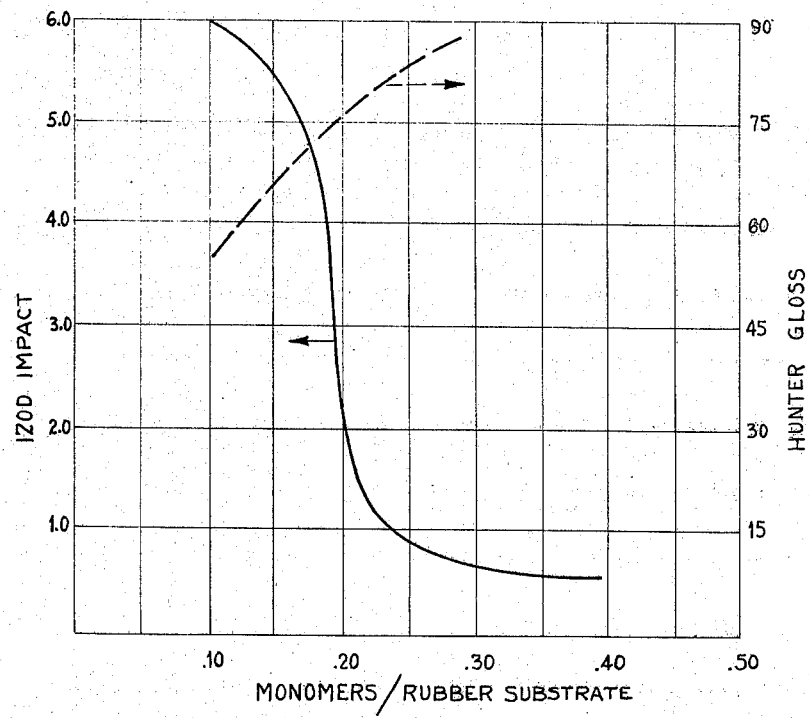

Other related objects and advantages will be readily apparent from the following detailed specification and the attached drawings wherein:

FIGURE 1 is a graph representing the effect of increasing the amount of the rubber graft components of the present invention on impact strength of the composition; and FIGURE 2 is a graph plotting the effect of the monomer charge during grafting of the low graft component upon the impact strength and gloss of the compositions of the present invention.

SUMMARY OF THE INVENTION

It has now been found that the foregoing and related objects and advantages may be readily attained in a composition comprising a polyblend of (A) a matrix of an interpolymer consisting at least principally of a monovinylidene aromatic hydrocarbon and an ethylenically unsaturated nitrile; (B) a first graft copolymer having a graftable rubber substrate containing a diene monomer component and a superstrate of an interpolymer consisting at least principally of a monovinylidene aromatic hydrocarbon and an ethylenically unsaturated nitrile; and (C) a second graft copolymer having a graftable rubber substrate containing a diene monomer component and a superstrate of an interpolymer consisting at least principally of a monovinylidene aromatic hydrocarbon and an ethylenically unsaturated nitrile. One of the graft copolymers has 0.7 to 5.0 grams of superstrate per square centimeter of substrate surface and the other graft copolymer has 7.0 to $35.0 \times 10^{-7}$ grams of superstrate per square centimeter of substrate surface. The two graft copolymers each have a particle size of about 0.03 to 0.6 micron and the total thereof comprises 1.0 to 70.0 percent by weight of the total blend. The first graft copolymer comprises about 20.0 to 97.0 percent of the total weight of the graft copolymers combined.

The theory of operation is not fully understood, but it is believed that the low graft particles have a tendency to cluster and simulate relatively large particles which provide a high degree of toughness which is then extended by the highly grafted rubber particles which do not exhibit this tendency. By proper combination, the two graft components cooperate in a manner such that the gloss and tensile properties of the composition are maintained at desirable levels.

DESCRIPTION OF THE PREFERRED EMBODIMENTS

The interpolymer

The interpolymers of the present invention of both the matrix and the graft superstrates consist at least principally of a monovinylidene aromatic hydrocarbon and an ethylenically unsaturated nitrile, i.e., such monomers comprise at least 50.0 percent by weight and preferably at least 75.0 percent by weight of the interpolymers. Most desirably, such monomers comprise at least 90.0 percent by weight of the interpolymer and the usual commercial compositions are substantially completely comprised of such monomers although minor amounts, i.e., less than 5.0 percent by weight of other components such as chain transfer agents, modifiers, etc., may be included.

As will be readily appreciated, the interpolymers used for the graft superstrates should be compatible with the interpolymer of the matrix so as to obtain good properties which will require the presence of the similar monomers. Most desirably, the superstrate interpolymers closely approximate the chemical composition of the interpolymer of the matrix so as to obtain matching of the chemical properties, and accordingly, it is desirable that the superstrates of both graft copolymers closely approximate each other. In addition, it is believed that increased chemical bonding is thereby obtained with commensurate improvement in chemical properties. Moreover, by close matching of certain interpolymers used in the matrix and superstrate such as those containing acrylate, it is possible to obtain a high degree of translucency and substantial transparency. However, it will be appreciated that deviations in the composition of the interpolymers of the matrix and superstrates such as different monomers and/ or ratios may be desirable for some applications and that some deviations may inherently occur as the result of process variables.

Exemplary of the monovylidene aromatic hydrocarbons which may be used in the interpolymers are styrene; alpha-alkyl monovinylidene monoaromatic compounds, e.g., alpha-methylstyrene, alpha-ethylstyrene, alpha-methyl-vinyltoluene, alpha-methyl dialkylstyrenes, etc.; ring-substituted alkyl styrenes, e.g., vinyl toluene, o-ethylstyrene, p-ethylstyrene, 2,4-dimethylstyrene, etc.; ring substituted halostyrene, e.g., o-chlorostyrene, p-chlorostyrene, o-bromostyrene, 2,4-dichlorostyrene, etc.; ring-alkyl, ring-halosubstituted styrenes, e.g., 2-chloro-4-methylstyrene, 2,6-dichloro-4-methylstyrene, etc.; vinyl naphthalene; vinyl anthracene, etc. The alkyl substitutents generally have 1 to 4 carbon atoms and may include isopropyl and isobutyl groups. If so desired, mixtures of such monovinylidene aromatic monomers may be employed.

Exemplary of the ethylenically unsaturated nitriles which may be used in the interpolymers are acrylonitrile, methacrylonitrile, ethacrylonitrile, and mixtures thereof.

Exemplary of the monomers which may be interpolymerized with the monovinylidene aromatic hydrocarbons and unsaturated nitriles are conjugated 1,3-dienes, e.g. butadiene, isoprene, etc.; alpha- or beta-unsaturated monobasic acids or derivatives thereof, e.g., acrylic acid, methyl acrylate, ethyl acrylate, butyl acrylate, 2-ethylhexyl acrylate, methacrylic acid and the corresponding esters thereof; acrylamide, methacrylamide; vinylidene chloride, vinylidene bromide, etc.; vinyl esters such as vinyl acetate, vinyl propionate, etc. dialkyl maleates or fumarates such as dimethyl maleate, diethyl maleate, dibutyl maleate, the corresponding fumarates, etc. As is known in the art, the amount of these comonomers which may be included in the interpolymer will vary as the result of various factors.

In addition, the monomer formulation at the time of polymerization may include a preformed polymer of a partially polymerized material such a partially polymerized monovinylidene aromatic hydrocarbon or interpolymer thereof.

The polymerizable monomer mixtures contain at least 20 percent by weight of the monovinylidene aromatic monomer and preferably at least 50 percent by weight thereof. They also contain at least 5 percent by weight of the unsaturated nitrile and preferably at least 10 percent by weight thereof. From the standpoint of highly advantageous commercial practice, the monomer formulations contain 20 to 95 percent, and preferably 60 to 85 percent, by weight of the vinylidene aromatic hydrocarbon and 80 to 5 percent, and preferably 40 to 15 percent, by weight of the unsaturated nitrile.

The matrix

As is well known in the art, the polyblend is produced by polymerizing the monomers in the presence of the preformed rubber. It is generally believed that a portion of the polymer formed grafts onto the preformed rubber since it is generally not possible to extract the rubber from the polymerized mass with the usual rubber solvents although some of the rubber polymer may not be in actual chemical combination with the polymer.

Since 100 percent grafting efficiency normally is approached only at ratios of monomers to substrate of below about 0.3:1, at least a portion of the monomers polymerized in the presence of the preformed rubber will not chemically combine therewith so as to provide a matrix for the graft copolymers. This portion may be increased or decreased depending upon the ratio of monomers to rubber, the particular monomer formulation, the nature of the rubber, and the conditions of polymerization. Generally, interpolymers prepared without the inclusion of rubber will be compounded with material from the graft polymerization reactions to obtain the desired composition.

Any of the usual polymerization processes may be used to effect polymerization of the ungrafted superstrate, i.e., mass, suspension and emulsion, or combinations thereof. Such techniques are well known and are also described herein with respect to the graft copolymerization reactions.

The rubber substrate

Various rubbers onto which the interpolymer may be grafted during the polymerization in the presence thereof are utilizable as the substrate of the graft copolymer including conjugated 1,3-diene rubbers, ethylene-propylene-diene terpolymer rubbers, acrylate-diene interpolymer rubbers, and mixtures thereof. Although saturated rubbers may be grafted, it has been found desirable to include at least a small amount (at least 1.0 percent by weight) of a diene monomer component such as butadiene or hexadiene to facilitate grafting in ethylene/propylene and acrylate rubbers. This diene monomer component will normally comprise 1 to 20 percent by weight and preferably 2 to 8 percent by weight of the ethylene/propylene/diene terpolymer or acrylate copolymer rubber.

The preferred rubbers are diene rubbers or mixtures of diene rubbers, i.e., any rubbery polymers (a polymer having a second order transition temperature not higher than 0° centigrade, preferably not higher than −20° centigrade, as determined by ASTM Test D–746–52T) of one or more conjugated 1,3-dienes, e.g., butadiene, isoprene, piperylene, chloroprene, etc. Such rubbers include homopolymers of conjugated 1,3-dienes and interpolymers of such 1,3-dienes with up to an equal amount by weight of one or more copolymerizable monoethylenically unsaturated monomers, such as monovinylidene aromatic hydrocarbons (e.g., styrene; an aralkylstyrene, such as the o-, m-, and p-methylstyrenes, 2,4-dimethylstyrene, the ar-ethylstyrenes, p-tert-butylstyrene, etc.; an alpha-alkylstyrene, such as alpha-methylstyrene, alpha-ethylstyrene, alpha-methyl-p-methylstyrene, etc.; vinyl naphthalene, etc.); ar-halo monovinylidene aromatic hydrocarbons (e.g., the o-, m-, and p-chlorostyrenes, 2,4-dibromostyrene, 2-methyl-4-chlorostyrene, etc.); acrylonitrile; methacrylonitrile; alkyl acrylates (e.g., methyl acrylate, butyl acrylate, 2-ethylhexyl acrylate, etc.), the corresponding alkyl methacrylates; acrylamides (e.g., acrylamide, methacrylamide, N-butyl acrylamide, etc.); unsaturated ketones (e.g., vinyl methyl ketone, methyl isopropenyl ketone, etc.); alpha-olefins (e.g., ethylene, propylene, etc.); pyridines; vinyl esters (e.g., vinyl acetate, vinyl stearate, etc.); vinyl and vinylidene halides (e.g., the vinyl and vinylidene chlorides and bromides, etc.); and the like.

Although the rubber may contain up to about 2 percent of a cross-linking agent, based on the weight of the rubber-forming monomer or monomers, cross-linking may present problems in dissolving the rubber in the monomers for the graft polymerization reaction. In addition, excessive cross-linking can result in loss of the rubbery characteristics. The cross-linking agent can be any of the agents conventionally employed for cross-linking diene rubbers, e.g., divinylbenzene, diallyl maleate, diallyl fumarate, diallyl adipate, allyl acrylate, allyl methacrylate diacrylates and dimethacrylates of polyhydric alcohols, e.g., ethylene glycol dimethacrylate, etc.

A preferred group of rubbers are those consisting essentially of 75 to 100 percent by weight of butadiene and/or isoprene and up to 25 percent by weight of a monomer selected from the group consisting of monovinylidene aromatic hydrocarbons (e.g., styrene) and unsaturated nitriles (e.g., acrylonitrile), or mixtures thereof. Particularly advantageous substrates are butadiene homopolymer or an interpolymer of 90 to 95 percent by weight butadiene and 5 to 10 percent by weight of acrylonitrile or styrene.

Of the various techniques customarily employed for polymerizing rubber monomers including mass, suspension and emulsion polymerization, emulsion polymerization is preferred since it will provide the particle size for which the present invention is most beneficially employed and may be used to produce a latex which is useful as the base for emulsion polymerization of the graft copolymer.

Graft polymerization processes

The graft copolymers are prepared by polymerizing monomers of the interpolymer in the presence of the preformed rubber substrate, generally in accordance with conventional graft polymerization techniques. Although suspension and mass polymerization techniques may be employed, the preferred processes use an emulsion technique to obtain the particle size of not more than about 0.6 micron for the graft copolymer with which the present invention is most beneficially employed. In such graft polymerization, the preformed rubber substrate generally is dissolved or dispersed in the monomers and this admixture is polymerized to combine chemically or graft at least a portion of the interpolymer upon the rubber substrate. Depending upon the ratio of monomers to rubber substrate and polymerization conditions, it is possible to produce both the desired degree of grafting of the interpolymer onto the rubber substrate and the polymerization of ungrafted interpolymer to provide a portion of the matrix at the same time.

As will be pointed out, more in detail hereinafter, the ratio of monomers to rubber charged to the graft polymerization reaction is the primary determinant of the superstrate:substrate ratio of the resultant graft copolymer. However, conditions of polymerization, rubber chemistry and particle size, rates of monomer addition, chain transfer agents, etc., may also exert an effect.

The catalyst is generally included within the range of 0.001 to 1.0 percent by weight, and preferably on the order of 0.005 to 0.5 percent by weight of the polymerizable material, depending upon the monomers and the desired polymerization cycle.

As is well known, it is often desirable to incorporate molecular weight regulators such as mercaptans, halides and terpenes in relatively small percentages by weight, on the order of 0.001 to 2.5 percent by weight of the polymerizable material. In addition, it may be desirable to include relatively small amounts of antioxidants or stabilizers such as the conventional alkylated phenols, although these may be added during or after polymerization.

In the emulsion polymerization process, the monomers and rubber substrate are emulsified in water by use of suitable emulsifying agents such as fatty acid soaps, alkali metal or ammonium soaps of high molecular weight alkyl or alkaryl sulfates and sulfonates, mineral acid salts of long chain aliphatic amines, etc. Emulsifying agents which have proven particularly advantageous are sodium oleate, sodium palmitate, sodium stearate and other sodium soaps. Generally, the emulsifying agent is provided in amounts of about 0.1 to 15 parts by weight per 100 parts by weight of the monomers, and water is provided in an amount of about 1 to 4 parts per part of monomers, and even in larger ratios where greater dilution is desirable.

If so desired, an aqueous latex formed in the emulsion polymerization of the rubber substrate may provide the aqueous medium into which the monomers are incorporated with or without additional emulsifying agents, water, etc. However, the rubber may be dissolved in the monomers and the mixture emulsified, or a latex thereof may be separately prepared.

Various water-soluble free radical polymerization initiators are conventionally used for emulsion polymerization of the rubber monomer including conventional peroxy and azo catalysts, and the resultant latex may be used as the aqueous medium with which the interpolymer monomers are admixed. In this manner, the catalyst for the rubber polymerization may function in whole or in part as the catalyst for the graft polymerization. However, additional catalyst may be added at the time of graft polymerization. Exemplary of suitable peroxy catalysts are the alkali metal peroxides, persulfates, perborates, peracetates and percarbonates, and hydrogen peroxide. If so desired, the catalysts may be activated to form redox systems. In addition, it may be advantageous to include an oil-soluble catalyst such as di-tert-butyl peroxide, benzoyl peroxide, lauroyl peroxide, oleyl peroxide, toluyl peroxide, di-tert-butyl diperphthalate, tert-butyl peracetate, tert-butyl perbenzoate, dicumyl peroxide, tert-butyl peroxide, isopropyl peroxy dicarbonate, 2,5-dimethyl-2,5-di-(tert-butylperoxy)hexane, 2,5-dimethyl-2,5-di-(tert-butylperoxy)hexyne-3-tert-butyl hydroperoxide, cumene hydroperoxide, p-methane hydroperoxide, cyclopentane hydroperoxide, diisopropylbenzene hydroperoxide, p-tert-butyl-cumene hydroperoxide, pinane hydroperoxide, 2,5-dimethylhexane-2,5-di-hydroperoxide, etc., and mixtures thereof. However, other free-radical generating catalysts may be employed such as actinic radiation.

Chain transfer agents and other polymerization modifiers may be desirably included and it is generally advantageous to incorporate a higher alkyl mercaptan such as tert-dodecyl mercaptan, which acts both as a promoter and a regulator. In addition, antioxidants and stabilizers such as the alkylated phenols may be added.

The emulsion mixture is then polymerized in an inert atmosphere at temperatures in the range of 20 to 100° centigrade with agitation. Pressures of 1 to 100 pounds per square inch may be employed and the monomers and/or additional catalyst may be added incrementally or continuously over a portion of the reaction cycle. Polymerization is continued until substantially all, i.e., more than 90 percent, of the monomers have reacted. The remaining monomers and other volatile components are then distilled from the latex, which is then dewatered, washed and dried.

Particle size of the emulsion graft particles may be varied by seeding, emulsifying agent concentration, agitation, rubber size variation through agglomeration prior to grafting, coagulation techniques, etc. One of the most advantageous means for achieving the desired particle size rubber substrate is by controlled agglomeration using acidulation or freeze-thaw techniques.

Effect of particle size and cross linking

Generally, the particle size of the rubber in the polymerizable monomers during the graft polymerization reactions has an effect upon the optimum grafting level for the low graft copolymer and to a lesser extent on the optimum grafting level for the high graft copolymer. As will be readily appreciated, a given weight percentage of smaller size rubber particles will provide considerably greater surface area for grafting than the equivalent weight of a larger size rubber particle. Accordingly, the density of grafting will be varied depending upon the size of the rubber particle. Generally, the smaller rubber particles will tolerate a higher superstrate/substrate ratio than the larger size particles to give generally comparable results.

To avoid any ambiguity which might be introduced by variation in particle size, the graft ratio is expressed in terms of weight of graft per square centimeter of the rubber surface. To determine the weight of graft per unit of surface area of the rubber substrate, the total area in square centimeters of 100 grams of rubber is first determined. Using the average diameter of the substrate as determined by number average and its density, the following formula is employed:

$$\text{Total area (sq. cm.)}(100 \text{ grams}) = \frac{(\text{area of particle}) \times 100}{(\text{volume of particle}) \times \text{density of particle}}$$

The weight of superstrate is determined for 100 grams of the graft copolymer by extracting the ungrafted matrix from a polymerization blend and subtracting the weight of rubber charge.

The particle size of the rubber graft copolymer in the polyblend also has a significant effect upon the gloss and tensile properties; i.e., increasing particle size of the graft copolymer tends to adversely affect these properties. Moreover, if the particles are in excess of about 0.6 micron, the benefits of the present invention are materially reduced. Accordingly, the particle size of the graft copolymers may be varied from as little as 0.03 micron to as much as about 0.6 micron, depending upon the ultimate properties of the composition. However, the preferred compositions utilize graft copolymers having a particle size of about 0.05 to 0.4 micron, and desirably 0.08 to 0.3.

In determining the average particle size, a dispersion of the graft copolymer particles is prepared and a photomicrograph thereof taken. The size of approximately 200 to 1000 particles is then measured and an average taken thereof so as to obtain an average particle size based upon a number average. Alternatively, other techniques of measurement may be employed such as light scattering techniques, so long as a reasonably close relationship is established between actual size and the technique employed.

Although the rubber may be cross-linked, this may present problems from the standpoint of dissolving or dispersing the rubber for a suspension polymerization process. However, for emulsion polymerization processes, the rubber desirably has a significant degree of cross-linking.

With respect to the graft copolymers, at least some degree of cross-linking is inherent during the graft polymerization processes, and this desirably may be augmented through the addition of cross-linking agents or control of the polymerization conditions. By obtaining a highly cross-linked high graft copolymer, the discreteness of the graft copolymer particles is more readily maintained so as to obtain optimum efficacy therefrom.

Graft ratio of the copolymers

As previously indicated, the low graft copolymer has a grafting level which may vary within the range of about 0.7 to $5.0 \times 10^{-7}$ gram of superstrate per square centimeter of substrate. As the amount of graft per unit of surface area is decreased below $0.7 \times 10^{-7}$ gram there is an apparent tendency for the particles to agglomerate excessively and reduce the effectiveness of the present invention, as well as a noticeable decrease in other properties. As the amount of graft exceeds about $5.0 \times 10^{-7}$ gram, there is a noticeable reduction in impact strength and other properties of the compositions. The preferred compositions employ a graft level of about 1.4 to $2.8 \times 10^{-7}$ gram per square centimeter.

The graft level in the highly grafted copolymer may vary from as little as $7.0 \times 10^{-7}$ gram per square centimeter of substrate surface to as high as $35.0 \times 10^{-7}$ gram. The preferred compositions utilize a graft level of about 8.4 to $21.0 \times 10^{-7}$ gram. Reducing the graft level in the highly grafted polymer below about $7.0 \times 10^{-7}$ gram tends to reduce various of the physical properties. The upper limit of 35.0 is essentially determined by the degree of grafting which has been obtainable in conventional processes, although it is possible that a higher degree of grafting would function satisfactorily.

In various tests, it has been found that the degree of grafting of the low graft component is most significant in determining the properties of the composition. FIGURE 2 of the attached drawing illustrates the effect of varying the monomer charge and thereby the graft ratio of the low graft component in a polyblend wherein the total content of rubber substrate was 16.0 percent by weight of the composition and wherein the graft ratio of the high graft component was maintained constant. The particle size of the rubber was about 0.11 micron and its density was about 0.9 gram per cubic centimeter. The grafting process was highly efficient so that the graft ratio is somewhat less than the charge ratio. In a series of compositions, equal amounts of the two graft copolymers were employed. As can be seen, the Izod impact value of the compositions thus prepared rapidly drops within the range of about 0.10 to 0.20 in the charge ratio and thereby in the graft level of about the same value. Simultaneously, the Hunter gloss value is increasing. Accordingly, the optimum formulations are those containing a graft copolymer having a grafting level which retains a fairly high impact value while affording good gloss.

Formation of the blend

The two graft copolymers may be blended in the ungrafted interpolymer matrix by various techniques. In the preferred techniques, the graft polymers are extrusion blended or mill rolled with or without the addition thereto of additional ungrafted interpolymer depending upon the amount of ungrafted interpolymer in the feedstocks providing the rubber grafts and the total rubber graft content desired in the blend. Alternatively, a mixed latex of the different graft level copolymers may be prepared and coagulated to provide a mixed coagulum containing the rubber grafts of the desired two particle graft levels in the desired proportions.

Generally, the blends may contain 1.0 to 70.0 percent by weight of the two rubber grafts combined. Increasing the total amount of rubber graft while maintaining the ratio of low graft copolymer to total graft copolymer constant generally increases the Izod impact strength of the composition but rapidly increases the viscosity of the blend and decreases the tensile stress at yield and fail and the tensile modulus. Accordingly, the preferred blends contain about 10.0 to 50.0 percent by weight of the combined graft copolymers and most desirably about 20.0 to 40.0 percent by weight.

The effect of varying the rubber content of the composition may be seen in FIGURE 1 of the attached drawings wherein a series of compositions were prepared containing the high graft and low graft components in a ratio of 60:40 and in which the content of the rubber substrate in the composition was varied by the addition of increased amounts of the two graft components. As can be seen, the Izod impact value rises relatively rapidly as the amount of rubber is increased.

Generally, the properties of the invention are most dependent upon the level of grafting of the low graft component and its percentage of the total graft copolymer. Accordingly, the compositions desirably contain the low graft copolymer component in an amount which increases as the amount of grafting is increased. The desirable ranges of composition for various low graft levels are set forth in Table 1 below:

TABLE 1

| Grams superstrate ($\times 10^{-7}$) per square centimeter: | Percent of total graft copolymer |
|---|---|
| 0.7–1.4 | 20–40 |
| 1.4–2.1 | 40–60 |
| 2.1–2.8 | 40–80 |
| 2.8–3.5 | 70–85 |
| 3.5–4.2 | 80–95 |
| 4.2–5.0 | 90–97 |

It will be readily appreciated that optional components may be added to the composition such as fillers, antioxidants, stabilizers, etc., depending upon the intended use and the nature thereof.

It has been found that the efficacy of the present invention may be further enhanced by including a small amount of relatively large particle size graft copolymer as is described and claimed in copending application, Ser. No. 619,488, filed Jan. 9, 1967 by Norman E. Aubrey and assigned to the assignee of the present invention. Generally, the relatively small particle graft copolymer of the present invention having both high and low graft components when combined with small amounts of graft copolymer having particle size of about 0.8 to 2.0 microns affords a beneficial blend from the standpoint of impact properties commensurate with acceptable gloss.

Exemplary of the efficacy of the present invention are the following specific examples wherein all parts are parts by weight unless otherwise indicated.

EXAMPLE 1

Part A

To 1200.0 parts of a latex of a butadiene-acrylonitrile copolymer (93:7) containing 50.0 percent solids and approximately 1.0 part of rubber reserve soap as an emulsifier were added 476.0 parts of water and 32.0 parts of a 2.0 percent aqueous solution of potassium persulfate. The emulsion was heated to 60° centigrade with stirring and then there were added thereto over a period of about six hours 80.0 parts styrene and 42.0 parts acrylonitrile. The emulsion was held at temperature for one hour thereafter with stirring, cooled, coagulated and the recovered copolymer was then washed and dried. The resulting graft copolymer had a superstrate to substrate ratio of about 0.2:1.0 and a particle size (number average) of about 0.09 micron.

The total area of 100 grams of rubber particles is determined as follows:

$$\text{Total area (cm.}^2\text{)} = \frac{600}{(9 \times 10^{-6})(0.9)} = \frac{600 \times 10^6}{8.1} = 7.4 \times 10^7$$

Thus, at 20 grams superstrate per 100 grams rubber, the graft level is $2.7 \times 10^{-7}$ gram per square centimeter of surface.

Part B

To 900 parts of a latex of a butadiene-acrylonitrile copolymer (93:7) containing 50.0 percent solids and approximately 1.0 part rubber reserve soap as an emulsifier were added 1055.0 parts water and 2.0 parts rubber reserve soap together with 240.0 parts of a 2.0 percent aqueous solution of potassium persulfate.

The emulsion was heated to about 65° centigrade with stirring and then there were added thereto over a period of about six hours 455.0 parts of styrene, 235.0 parts acrylonitrile and 4.8 parts of terpinolene as a chain transfer agent. The emulsion was held at temperature for one hour thereafter with stirring, cooled, coagulated and the graft copolymer was then washed and dried. The resulting graft copolymer had a superstrate to substrate ratio of about 1.0:1.0 and the average particle size based upon number average was about 0.14 micron.

The total area of 100 grams of the rubber substrate is determined as follows:

$$\text{Area (cm.}^2\text{)} = \frac{600}{(14 \times 10^{-6})0.9} = 47.5 \times 10^6$$

Thus, at 100 grams superstrate per 100 grams substrate, the graft level is determined to be $21 \times 10^{-7}$ gram per square centimeter of surface.

EXAMPLE 2

Part A

The process of Part A of Example 1 was substantially repeated utilizing only 16.0 parts of the aqueous solution of potassium persulfate, 40.0 parts styrene and 21.0 parts acrylonitrile. The amount of water added to the rubber latex was 403.0 parts. The resulting graft copolymer had a superstrate to substrate ratio of about 10.0:100.0.

Part B

Two hundred parts of the graft copolymer prepared in Part A above were admixed in the extrusion blender with 456.0 parts of the copolymer produced in Part B of Example 1 and 347.0 parts of styrene-acrylonitrile to produce a polyblend.

Moldings produced from the above composition were found to have an Izod impact value of 5.5 foot pounds and to have a Hunter gloss value of 43. The percent shrinkage was 43.0 percent.

EXAMPLE 3

Part A

The process of Part B of Example 1 was substantially repeated except that 800.0 parts of the rubber latex, 500.0 parts styrene, 263.0 parts acrylonitrile, 5.3 parts terpinolene, 265.0 parts of aqueous potassium persulfate solution and 1097 parts of water were employed.

Part B

A polyblend was prepared by extrusion blending 515.0 parts of the graft copolymer of Part A above, 287.0 parts of styrene-acrylonitrile copolymer and 200.0 parts of the graft copolymer produced in Part A of Example 2 above.

Moldings produced from the composition were found to have an Izod impact value of 5.3 foot pounds and a Hunter gloss value of 45. The percent shrinkage was 42.0 percent.

EXAMPLE 4

Part A

A first composition was prepared utilizing a single graft copolymer having a superstrate to substrate ratio of 50:100. The matrix and superstrate interpolymers were styrene-acrylonitrile (70:30), and the rubber substrate comprised about 16.0 percent by weight of the total composition. The impact value of this composition was found to be 6.8 foot pounds, and the Hunter gloss value was 0.

Part B

A similar composition was prepared containing a single graft copolymer having a superstrate to substrate ratio of 200:100. The Izod impact value of this composition was 0.6 foot pound and the Hunter gloss value was 97.

Part C

A blend of equal amounts of the graft copolymers of Parts A and B above in a polyblend containing 16.0 percent by weight of total rubber was prepared. The moldings therefrom had an Izod impact value of 5.6 foot pounds and a Hunter gloss value of 67. Thus, it can be seen that the blend containing the highly grafted component and the lowly grafted component in combination exhibited a highly desirable balance of properties.

From the foregoing detailed specification and examples, it will be readily apparent that the present invention provides a novel polyblend of rubber which exhibits a highly desirable balance of properties and which affords the opportunity for facile tailoring of properties through variation in the relative amounts of the two graft components, the graft level of the low graft copolymer and the total amount of the graft compenents combined in the composition. By selecting optimum values, the compositions exhibit an extremely desirable balance of properties.

It can be seen that the present invention affords the opportunity for stocking components which may be blended with each other and with ungrafted interpolymer providing the matrix so as to yield a wide range of compositions of the desired proporties. As will be readily appreciated, existing equipment can be employed for preparing the rubber graft components and the interpolymer matrix. Accordingly, the processes and compositions of the present invention are relatively economical and facile to employ.

It is obvious that many variations can be made in the processes set forth without departing from the spirit and scope of the invention.

What is claimed is:

1. A composition comprising a polyblend of: (A) a matrix of an interpolymer consisting at least principally of a monovinylidene aromatic hydrocarbon and an ethylenically unsaturated nitrile; (B) a first graft copolymer having a graftable rubber substrate containing a diene monomer component and a superstrate of an interpolymer consisting at least principally of a monovinylidene aromatic hydrocarbon and an ethylenically unsaturated nitrile, said first graft copolymer having 0.7 to $5.0 \times 10^{-7}$ gram of superstrate per square centimeter of substrate surface; and (C) a second graft copolymer having a graftable rubber substrate containing a diene monomer component and a superstrate of an interpolymer consisting at least principally of a monovinylidene aromatic hydrocarbon and an ethylenically unsaturated nitrile, said second graft copolymer having 7.0 to $35.0 \times 10^{-7}$ gram of superstrate per square centimeter of substrate surface, said first and second graft copolymers each having a particle size of about 0.03 to 0.6 micron and the total thereof comprising 1.0 to 70.0 percent by weight of said polyblend and said first graft copolymer comprising about 20.0 to 97.0 percent by weight of the total weight of the graft copolymers combined.

2. The composition of claim 1 wherein said monovinylidene aromatic hydrocarbon of said interpolymers of the matrix and graft copolymer superstrates is styrene and said unsaturated nitrile is acrylonitrile.

3. The composition of claim 1 wherein the rubber substrate of said graft copolymers contains at least about 75 percent by weight of conjugated 1,3-diene.

4. The composition of claim 1 wherein said monovinylidene aromatic hydrocarbon and unsaturated nitrile comprise at least 75.0 percent by weight of the interpolymers of the graft copolymer superstrates and matrix.

5. The composition of claim 1 wherein said graft copolymers combined comprised about 10.0 to 50.0 percent by weight of said polyblend.

6. The composition of claim 1 wherein said first graft copolymer has a particle size of about 0.03–0.3 micron and about 1.4 to $2.8 \times 10^{-7}$ gram of superstrate per square centimeter of substrate surface and wherein said second graft copolymer has a particle size of about 0.03–0.3 micron and about $8.4$–$21.0 \times 10^{-7}$ gram of superstrate per square centimeter of substrate surface.

7. The composition of claim 1 wherein said first graft copolymer has a particle size of about 0.3–0.6 micron and about $3.6$–$5.0 \times 10^{-7}$ gram of superstrate per square centimeter of substrate surface and wherein said second graft copolymer has a particle size of about 0.3 to 0.6 micron and about $8.4$–$21.0 \times 10^{-7}$ gram of superstrate per square centimeter of substrate surface.

8. The composition of claim 1 wherein said graft copolymers have an average particle size, based on number average, of about 0.05 to 0.4 micron.

9. The composition of claim 1 wherein said first graft polymer has a particle size of about 0.05–0.4 micron and is present in the composition at the following superstrate to substrate area relationships—

| Grams per cm.$^2$ substrate $\times 10^{-7}$: | Percent of total graft copolymers |
| --- | --- |
| 0.7–1.4 | 20–40 |
| 1.4–2.1 | 40–60 |
| 2.1–2.8 | 50–80 |
| 2.8–3.5 | 70–85 |
| 3.5–4.2 | 80–95 |
| 4.2–5.0 | 90–97 |

10. A composition comprising a polyblend of: (A) a matrix of an interpolymer consisting at least principally of a monovinylidene aromatic hydrocarbon and an ethylenically unsaturated nitrile; (B) a first graft copolymer having a graftable rubber substrate containing at least 75 percent by weight of a conjugated 1,3-diene and a superstrate of an interpolymer consisting at least principally of a monovinylidene aromatic hydrocarbon and an ethylenically unsaturated nitrile, said first graft copolymer having 0.7 to $5.0 \times 10^{-7}$ gram superstrate per square centimeter of substrate surface; and (C) a second graft copolymer having a rubber substrate containing at least 75 percent by weight of a conjugated 1,3-diene and a superstrate of an interpolymer consisting at least principally of a monovinylidene aromatic hydrocarbon and an ethylenically unsaturated nitrile, said second graft copolymer having 8.4 to $21.0 \times 10^{-7}$ gram of superstrate per square centimeter of substrate surface, said first and second graft copolymer, each having a particle size of about 0.05 to 0.4 micron, and the total thereof comprising 10 to 50 percent by weight of said polyblend and said first graft copolymer comprising about 40.0 to 85.0 percent by weight of the total weight of the graft copolymers combined.

11. The composition of claim 10 wherein said monovinylidene aromatic hydrocarbon of said interpolymers of the matrix and graft copolymer superstrates is styrene and said unsaturated nitrile is acrylonitrile.

12. The composition of claim 10 wherein said monovinylidene aromatic hydrocarbon and unsaturated nitrile comprise at least 75.0 percent by weight of the interpolymers of the graft copolymer superstrates and matrix.

13. The composition of claim 10 wherein said first graft copolymer is present in the composition at the following superstrate to substrate area relationships—

| Grams per cm.$^2$ substrate $\times 10^{-7}$: | Percent of total graft copolymers |
| --- | --- |
| 0.7–1.4 | 20–40 |
| 1.4–2.1 | 40–60 |
| 2.1–2.8 | 50–80 |
| 2.8–3.5 | 70–85 |
| 3.5–4.2 | 80–95 |
| 4.2–5.0 | 90–97 |

14. The composition of claim 10 wherein said monovinylidene aromatic hydrocarbon of said interpolymers of the matrix and graft copolymer superstrates is styrene and wherein said unsaturated nitrile of said interpolymers is acrylonitrile and wherein said styrene and acrylonitrile comprise at least 75.0 percent by weight of the interpolymers of said graft copolymer superstrates and matrix.

15. In the process for preparing a polyblend, the steps comprising: (A) polymerizing a first polymerizable mixture containing a monomer formulation and a prepolymerized graftable rubber containing a diene monomer component to graft at least a portion of the polymerizing monomers upon said rubber and to provide a first graft copolymer, said monomer formulation consisting at least principally of a monovinylidene aromatic hydrocarbon and an ethylenically unsaturated nitrile, said first graft copolymer having a graftable rubber substrate containing a diene monomer component and a superstrate of an interpolymer consisting at least principally of a monovinylidene aromatic hydrocarbon and an ethylenically unsaturated nitrile, said first graft copolymer having 0.7 to $5.0 \times 10^{-7}$ gram of superstrate per square centimeter of substrate surface; (B) polymerizing a second polymerizable mixture containing a monomer formulation and a prepolymerized graftable rubber containing a diene monomer component to graft at least a portion of the polymerizing monomers upon said rubber and to provide a second graft copolymer, said monomer formulation consisting at least principally of a monovinylidene aromatic hydrocarbon and an ethylenically unsaturated nitrile, said second graft copolymer having a graftable rubber substrate containing a diene monomer component and a superstrate of an interpolymer consisting at least principally of a monovinylidene aromatic hydrocarbon having 7.0 to $35.0 \times 10^{-7}$ gram of superstate per square centimeter of substrate surface; and (C) blending said first and second graft copolymers with ungrafted interpolymer consisting at least principally of a monovinylidene aromatic hydrocarbon and an ethylenically unsaturated nitrile to provide a polyblend wherein said graft copolymers combined comprise 1.0 to 70.0 percent by weight thereof and wherein said first graft copolymer comprises about 20.0 to 97.0 percent by weight of the total weight of the graft copolymers combined, said graft copolymers each having a particle size of about 0.03 to 0.6 micron.

16. The process of claim 15 wherein said monovinylidene aromatic hydrocarbon of said monomer formulations and of said ungrafted interpolymers is styrene and wherein said unsaturated nitrile thereof is acrylonitrile.

17. The process of claim 15 wherein the rubber substrate of said first and second mixtures is selected from the group consisting of diene rubber polymers containing at least 75.0 percent by weight of a conjugated 1,3-diene.

18. The process of claim 15 wherein said monovinylidene aromatic hydrocarbon and unsaturated nitrile comprise at least 75.0 percent by weight of the monomer formulations of said first and second mixtures.

19. The process of claim 15 wherein said second graft copolymer has a particle size of about 0.05-0.4 micron and is present in the polyblend at the following superstrate to substrate area relationships—

| Grams per cm.$^2$ substrate $\times 10^{-7}$: | Percent of total graft copolymers |
|---|---|
| 0.7–1.4 | 20–40 |
| 1.4–2.1 | 40–60 |
| 2.1–2.8 | 50–80 |
| 2.8–3.5 | 70–85 |
| 3.5–4.2 | 80–95 |
| 4.2–5.0 | 90–97 |

20. The process of claim 19 wherein the rubber substrate of said first and second mixtures is selected from the group consisting of diene rubber polymers containing at least 75.0 percent by weight of a conjugated 1,3-diene, and wherein said monovinylidene aromatic hydrocarbon and unsaturated nitrile comprise at least 75.0 percent by weight of the monomer formulations of said first and second mixtures.

References Cited

UNITED STATES PATENTS

| 3,073,798 | 1/1963 | Baer | 260—880 XR |
| 3,170,964 | 2/1965 | Grabowski | 260—876 |
| 3,267,175 | 8/1966 | Grabowski | 260—880 XR |

FOREIGN PATENTS

| 1,009,655 | 11/1965 | Great Britain. |

MURRAY TILLMAN, Primary Examiner

K. E. KUFFNER, Assistant Examiner

U.S. Cl. X.R.

260—880

PO-1050
(5/69)

UNITED STATES PATENT OFFICE
CERTIFICATE OF CORRECTION

Patent No. 3,509,238     Dated April 28, 1970

Inventor(s) Norman E. Aubrey & Michael B. Jastrzebski

It is certified that error appears in the above-identified patent and that said Letters Patent are hereby corrected as shown below:

Column 2, line 20, after "0.7 to 5.0" insert --- $\times 10^{-7}$ ---.

Claim 5, line 2, change "comprised" to read --- comprise ---.

SIGNED AND
SEALED

SEP 29 1970

(SEAL)
Attest:

Edward M. Fletcher, Jr.
Attesting Officer

WILLIAM E. SCHUYLER, JR.
Commissioner of Patents